(12) United States Patent
Li et al.

(10) Patent No.: US 11,815,230 B2
(45) Date of Patent: Nov. 14, 2023

(54) WIRELESS COMMUNICATION SYSTEM AND COMMUNICATION METHOD FOR CABLELESS DETECTION ROBOT FOR GAS PIPELINE

(71) Applicant: BEIJING GAS GROUP COMPANY LIMITED, Beijing (CN)

(72) Inventors: Xiaxi Li, Beijing (CN); Qingyu Wang, Beijing (CN); Linlin Xing, Beijing (CN); Zandong Han, Beijing (CN); Jiabao Zhang, Beijing (CN); Qiang Jin, Beijing (CN); Ruili Ma, Beijing (CN); Fan Yang, Beijing (CN); Wenqing Tian, Beijing (CN)

( * ) Notice: Subject to any disclaimer, the term of this patent is extended or adjusted under 35 U.S.C. 154(b) by 1114 days.

(21) Appl. No.: 16/489,309

(22) PCT Filed: Mar. 12, 2019

(86) PCT No.: PCT/CN2019/077828
§ 371 (c)(1),
(2) Date: Aug. 27, 2019

(87) PCT Pub. No.: WO2019/179336
PCT Pub. Date: Sep. 26, 2019

(65) Prior Publication Data
US 2021/0356081 A1 Nov. 18, 2021

(30) Foreign Application Priority Data
Mar. 21, 2018 (CN) .......................... 201810233748.4

(51) Int. Cl.
*F17D 5/00* (2006.01)
*F17D 5/02* (2006.01)
(Continued)

(52) U.S. Cl.
CPC .............. *F17D 5/005* (2013.01); *F16L 55/32* (2013.01); *F16L 55/40* (2013.01); *F17D 5/02* (2013.01);
(Continued)

(58) Field of Classification Search
CPC .. F17D 5/005; F17D 5/02; F16L 55/40; F16L 55/32; G01N 2021/9544
See application file for complete search history.

(56) References Cited

U.S. PATENT DOCUMENTS

2005/0145018 A1   7/2005  Sabata
2016/0325321 A1*  11/2016 Zahnd ...................... E03F 9/00

FOREIGN PATENT DOCUMENTS

JP         07202791 A       8/1995
JP         3229476 B2      11/2001

* cited by examiner

*Primary Examiner* — Daniel J Colilla
(74) *Attorney, Agent, or Firm* — Novoclaims Patent Services LLC; Mei Lin Wong

(57) ABSTRACT

The present disclosure relates to a wireless communication system and communication method for a cableless detection robot for a gas pipeline. The wireless communication system includes an antenna assembly, a repeater assembly and a repeater retracting device, wherein the antenna assembly is fixed to the gas pipeline and extends into the interior of the gas pipeline, the repeater assembly is provided with at least one set, and the repeater retracting device is connected to the robot and used for retracting the repeater assembly along the gas pipeline, the antenna assembly, the repeater assembly and the robot are connected through a wireless signal having a wavelength less than 3.41r, wherein r represents the radius of the gas pipeline. The wireless communication system has the advantages of simple structure, low cost, convenient use, safety and reliability, and solves the problem that the automatic force cableless detection robot cannot perform a (Continued)

long-distance internal detection operation due to shielding wireless signals by the pipeline. The communication method has the advantages of easy implementation, convenient control and reliable communication.

6 Claims, 3 Drawing Sheets

(51) Int. Cl.
*F16L 55/40* (2006.01)
*F16L 55/38* (2006.01)
*G08C 17/02* (2006.01)
*H01Q 1/22* (2006.01)
*H01Q 3/02* (2006.01)
*H04B 7/26* (2006.01)
*H04Q 9/00* (2006.01)
*F16L 55/32* (2006.01)
*H04B 7/15* (2006.01)
*G01N 21/954* (2006.01)

(52) U.S. Cl.
CPC ............ *G08C 17/02* (2013.01); *H01Q 1/225* (2013.01); *H01Q 3/02* (2013.01); *H04B 7/2606* (2013.01); *H04Q 9/00* (2013.01); *G01N 2021/9544* (2013.01); *H04B 7/15* (2013.01); *H04Q 2209/40* (2013.01); *H04Q 2209/50* (2013.01)

though the current technology for in-pipe detection in this field mainly adopts cable detection robots, and wired communication is used between a control terminal and the robot during the detection process. Due to the length of the cables and the direction of the pipelines, the cable detection robot cannot complete a long-distance internal detection task, which affects the detection performance and efficiency. Especially for the city underground gas pipelines, there are many elbows, tees and reducers, and the pipelines are more complicated, which further limits the detection distance of the cable detection robot. Although an automatic force cableless detection robot is not restricted by cables, it needs to communicate with the control terminal through a wireless signal. Since the pipelines will shield the wireless signal, the existing communication mode of the automatic force cableless detection robot also cannot realize long-distance gas pipeline internal detection operation.

WIRELESS COMMUNICATION SYSTEM AND COMMUNICATION METHOD FOR CABLELESS DETECTION ROBOT FOR GAS PIPELINE

CROSS-REFERENCE TO RELATED APPLICATIONS

This application is a continuation of international application No. PCT/CN2019/077828 filed on Mar. 12, 2019, which claims the benefit and priority of Chinese patent application No. CN2018102337484, filed Mar. 21, 2018, entitled "wireless communication system and communication method for cableless detection robot for gas pipeline". Both applications are incorporated herein in their entirety by reference.

TECHNICAL FIELD

The present disclosure relates to a wireless communication system and, more particularly, to a wireless communication system and communication method for a cableless detection robot for a gas pipeline.

BACKGROUND

With the adjustment of the national energy structure and the improvement of people's living standards, natural gas has become an important energy source for people's production and life, and has promoted the continuous expansion of the construction scale of city gas pipeline network. With the increase of service life, the probability of safety accidents caused by various defects in city underground gas pipelines is also increasing. Therefore, it is particularly important to carry out the internal detection of the city underground gas pipelines. The internal detection can detect defects such as pipeline corrosion, perforation, cracking, and the like, so as to provide effective support for eliminating potential safety hazards in time and ensuring the safe operation of gas pipelines. However, the current technology for in-pipe detection in this field mainly adopts cable detection robots, and wired communication is used between a control terminal and the robot during the detection process. Due to the length of the cables and the direction of the pipelines, the cable detection robot cannot complete a long-distance internal detection task, which affects the detection performance and efficiency. Especially for the city underground gas pipelines, there are many elbows, tees and reducers, and the pipelines are more complicated, which further limits the detection distance of the cable detection robot. Although an automatic force cableless detection robot is not restricted by cables, it needs to communicate with the control terminal through a wireless signal. Since the pipelines will shield the wireless signal, the existing communication mode of the automatic force cableless detection robot also cannot realize long-distance gas pipeline internal detection operation.

SUMMARY

The object of the present disclosure is to provide a wireless communication system and communication method for a cableless detection robot for a gas pipeline. The wireless communication system has the advantages of simple structure, low cost, convenient use, safety and reliability, and solves the problem that the automatic force cableless detection robot cannot perform a long-distance internal detection operation due to shielding wireless signals by the pipeline. The communication method has the advantages of easy implementation, convenient control and reliable communication.

In order to solve the above problem in the prior art, the present disclosure provides a wireless communication system for a cableless detection robot for a gas pipeline, including an antenna assembly, a repeater assembly and a repeater retracting device, wherein the antenna assembly is fixed to the gas pipeline and extends into the interior of the gas pipeline, the repeater assembly is provided with at least one set, and the repeater retracting device is connected to the robot and used for retracting the repeater assembly along the gas pipeline, the antenna assembly, the repeater assembly and the robot are connected through a wireless signal having a wavelength less than $3.41r$, wherein $r$ represents a radius of the gas pipeline.

Further, the antenna assembly includes a flange plate and a lifting device vertically and fixedly connected to the flange plate, the flange plate is fixedly connected to a diffusion port flange of the gas pipeline, one end of the lifting device in the gas pipeline is provided with an antenna body, and one end of the lifting device outside the gas pipeline is provided with a connector electrically connected to the antenna body.

Further, the end of the lifting device of the antenna assembly outside the gas pipeline is further provided with an antenna angle adjuster.

Further, the repeater retracting device includes a repeater cartridge body, a vertical sliding rail, a lateral sliding rail and a manipulator, wherein a lower end of the vertical sliding rail is fixedly connected to the repeater cartridge body, one end of the lateral sliding rail is connected to the vertical sliding rail through a vertical sliding block, and the manipulator is connected to the lateral sliding rail through a lateral sliding block.

Further, the repeater assembly includes a base and a repeater main body fixed to the base, the base includes a connecting block, a U-shaped magnetic block embedded in the connecting block and having an opening facing downward, and a first magnetic guide block and a second magnetic guide block corresponding to lower sides of two ends of the U-shaped magnetic block, wherein a first sliding chute is disposed at a position corresponding to a gap between a left side of the connecting block and the first magnetic guide block and the U-shaped magnetic block, a first sliding magnetic conductive plate is arranged in the first sliding chute, a first return spring is disposed between the first sliding magnetic conductive plate and the connecting block, a second sliding chute is disposed at a position corresponding to a gap between a right side of the connecting block and the second magnetic guide block and the U-shaped magnetic block, a second sliding magnetic conductive plate is arranged in the second sliding chute, and a second return spring is disposed between the second sliding magnetic conductive plate and the connecting block.

The present disclosure provides a wireless communication method for a cableless detection robot for a gas pipeline, applied in the above wireless communication system, including the following steps:

S1. arranging the antenna assembly at a diffusion port of the gas pipeline, disposing a plurality of the repeater assemblies in the repeater cartridge body of the repeater retracting device, and connecting the repeater retracting device to the robot;

S2. arranging the robot and the repeater retracting device in the gas pipeline through a robot retracting device disposed on the gas pipeline;

S3. sending, by the control terminal, a test signal to the robot through the antenna assembly and receiving a feedback signal from the robot, comparing the test signal and the feedback signal, and adjusting an angle of the antenna body through the antenna angle adjuster to optimize wireless signal transmission between the antenna assembly and the robot;

S4. sending, by the control terminal, a detection instruction to the robot through the antenna assembly, making the robot to travels along the gas pipeline after receiving the detection instruction, and receiving, by the control terminal, a detection signal sent by the robot through the antenna assembly during the traveling process;

S5. during the traveling process of the robot, placing, by the repeater retracting device, the repeater assemblies in the repeater cartridge body one by one in the gas pipeline through the manipulator according to a preset interval distance;

S6. making the robot to return along an original path after a detection task is completed, and sequentially collecting, by the repeater retracting device, the repeater assemblies in the gas pipeline into the repeater cartridge body through the manipulator during the returning process of the robot, wherein the wavelengths of the test signal, the feedback signal, the detection instruction and the detection signal are less than 3.41r, wherein r represents the minimum radius of the detected gas pipeline.

Compared with the prior art, the wireless communication system and communication method for a cableless detection robot for a gas pipeline provided by the present disclosure have the following advantages: by arranging the antenna assembly, the repeater assembly and the repeater retracting device, wherein the antenna assembly is fixed to the gas pipeline and extends into the interior of the gas pipeline, the repeater assembly is provided with at least one set, and the repeater retracting device is connected to the robot and used for retracting the repeater assembly along the gas pipeline, the antenna assembly, the repeater assembly and the robot are connected through a wireless signal having a wavelength less than 3.41r, wherein r represents the radius of the gas pipeline, a wireless communication system for a cableless detection robot for a gas pipeline having the advantages of simple structure, low cost, convenient use, safety and reliability is constructed. In practical applications, by making the antenna assembly, the repeater assembly and the robot to use the wireless signal having a wavelength less than 3.41r, the wireless signal will propagate in the form of waveguide along the inside of the gas pipeline, thereby establishing a two-way communication connection between the antenna assembly and the robot, and then by connecting the control terminal to the antenna assembly, the control terminal can control the robot and receive the detection signal from the robot. Since the transmission of the wireless signal (an electromagnetic wave) in the gas pipeline (a metal pipeline) will be affected by various factors such as transmission frequency, pipe radius, pipe wall roughness, medium in the pipeline, and the like, the energy and power of the wireless signal will gradually decline with the extension of a transmission distance. Further, by arranging the repeater retracting device and the plurality of sets repeater assemblies, during the detecting and traveling processes of the robot, placing, by the repeater retracting device, the repeater assemblies one by one in the gas pipeline according to the preset interval distance, and sequentially collecting the repeater assemblies during the returning process, the reliability and stability of the communication connection between the antenna assembly and the robot are ensured under the amplification effect of the repeater assembly on the wireless signal, therefore, the purpose of performing the long-distance detection in the gas pipeline by the robot can be realized. The communication method for a cableless detection robot for a gas pipeline has the advantages of easy implementation, convenient control and reliable communication.

BRIEF DESCRIPTION OF THE DRAWINGS

To describe the technical solutions in the present disclosure more clearly, the following briefly describes the accompanying drawings required for describing the implementations.

DETAILED DESCRIPTION

Figure 1:
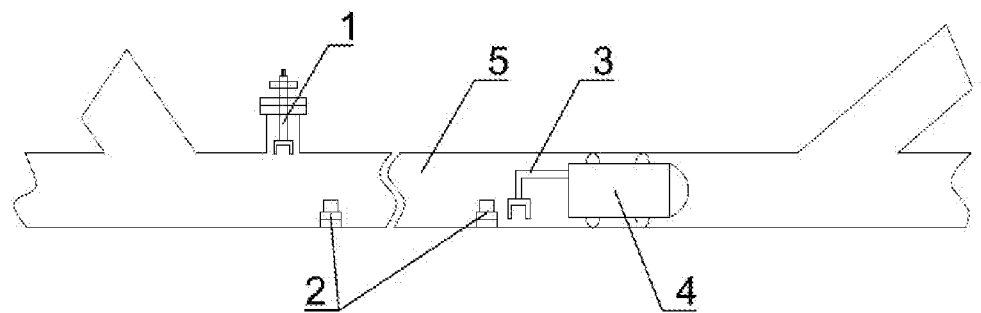
FIG. 1 is a schematic diagram of a wireless communication system for a cableless detection robot for a gas pipeline according to the present disclosure.
Figure 2:
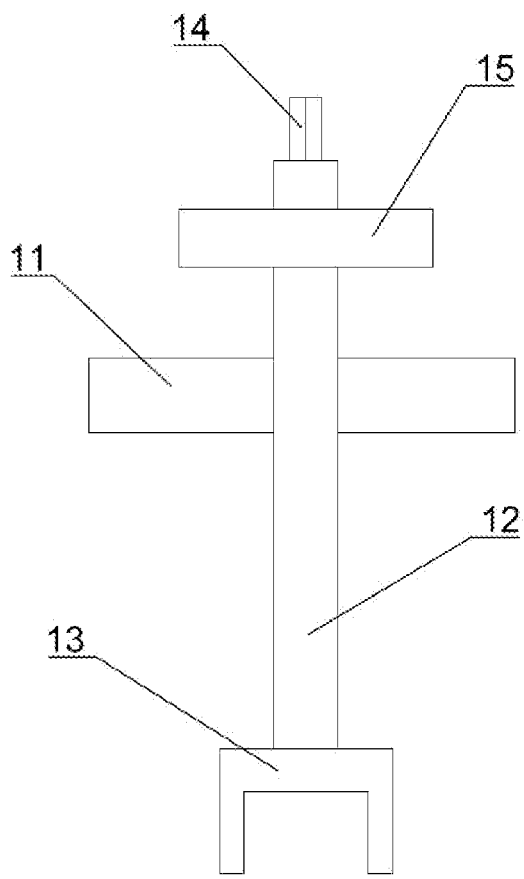
FIG. 2 is a schematic diagram of an antenna assembly in a wireless communication system for a cableless detection robot for a gas pipeline according to the present disclosure.
Figure 3:
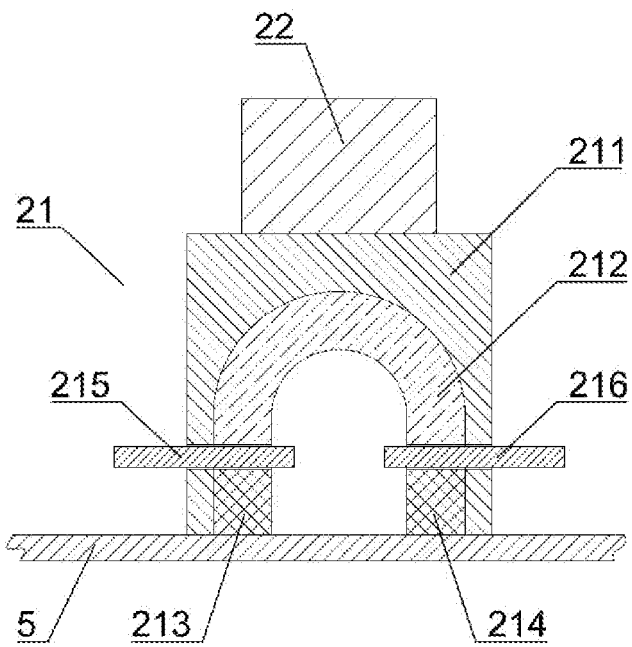
FIG. 3 is a schematic diagram of a repeater assembly in a wireless communication system for a cableless detection robot for a gas pipeline according to the present disclosure.
Figure 4:
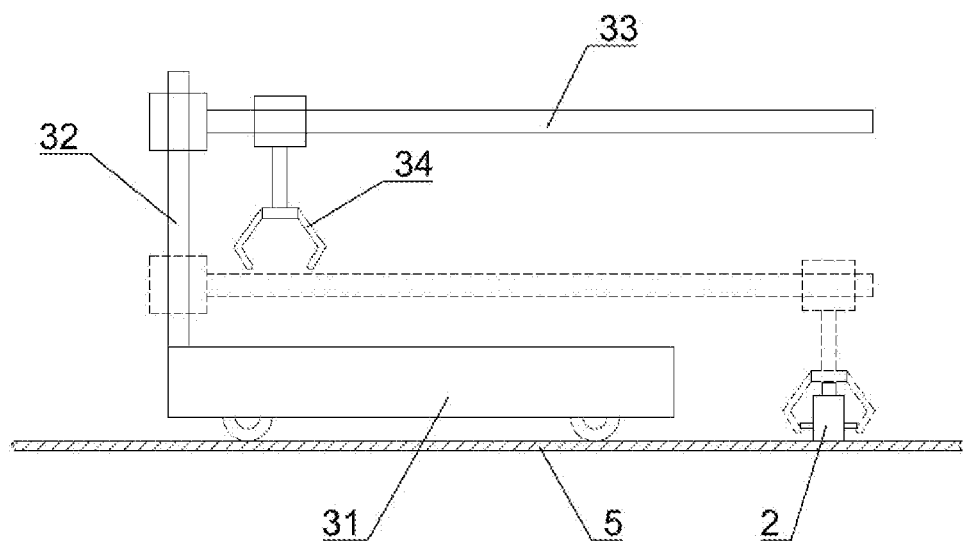
FIG. 4 is a schematic diagram of a repeater retracting device in a wireless communication system for a cableless detection robot for a gas pipeline according to the present disclosure.

To make the technical objectives, technical solutions, and advantageous effects of the present disclosure clearer, the following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that nouns of locality such as "on", "under", "left", "right", "before" and "after" in the embodiments of the present disclosure are only described according to the drawings, so as to facilitate understanding and not to limit the technical solutions of the present disclosure and the scope of the claimed protection. Unless specified or limited otherwise, terms "mounted", "connected", "coupled", "fixed", and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

As shown in FIGS. 1 to 4, a wireless communication system for a cableless detection robot for a gas pipeline in the embodiments of the present disclosure includes an antenna assembly 1, a repeater assembly 2 and a repeater retracting device 3. The antenna assembly 1 is fixed to the gas pipeline 5 and extends into the interior of the gas pipeline, the repeater assembly 2 is provided with at least one set, and the repeater retracting device 3 is connected to the robot 4 and used for retracting the repeater assembly 2 along the gas pipeline 5. When using, the antenna assembly 1, the repeater assembly 2 and the robot 4 are connected through a wireless signal having a wavelength less than 3.41r, wherein r is a radius of the gas pipeline.

Through the above structural arrangement, a wireless communication system for a cableless detection robot for a gas pipeline having the advantages of simple structure, low cost, convenient use, safety and reliability is constructed. In practical applications, by making the antenna assembly 1, the repeater assembly 2 and the robot to use the wireless signal having a wavelength less than 3.41r, the wireless signal will propagate in the form of waveguide along the inside of the gas pipeline, thereby establishing a two-way communication connection between the antenna assembly 1 and the robot, and then by connecting the control terminal to the antenna assembly 1, the control terminal can control the robot and receive the detection signal from the robot. Since the transmission of the wireless signal (an electromagnetic wave) in the gas pipeline (a metal pipeline) will be affected by various factors such as transmission frequency, pipe radius, pipe wall roughness, medium in the pipeline, and the like, the energy and power of the wireless signal will gradually decline with the extension of a transmission distance. Further, by arranging the repeater retracting device 3 and the plurality of sets repeater assemblies 2, during the detecting and traveling processes of the robot, placing, by the repeater retracting device 3, the repeater assemblies 2 one by one in the gas pipeline according to the preset interval distance, and sequentially collecting the repeater assemblies 2 during the returning process, the reliability and stability of the communication connection between the antenna assembly 1 and the robot are ensured under the amplification effect of the repeater assembly 2 on the wireless signal, therefore, the purpose of performing the long-distance detection in the gas pipeline by the robot can be realized.

In a specific embodiment, the antenna assembly 1 in the present disclosure specifically includes a flange plate 11 and a lifting device 12 vertically and fixedly connected to the flange plate 11, the flange plate 11 is fixedly connected to a diffusion port flange of the gas pipeline, one end of the lifting device 12 in the gas pipeline is provided with an antenna body 13, and one end of the lifting device 12 outside the gas pipeline is provided with a connector 14 electrically connected to the antenna body 13. The antenna assembly 1 with this structure has the advantages of simple structure, low cost and convenient disassembly and assembly, and fully utilizes the structural features of the existing gas pipeline network, that is, the installation of the antenna assembly 1 can be realized only by fixedly connecting the flange plate 11 to the diffusion port flange of the gas pipeline without damaging the structure of the gas pipeline, and thus the safety is high. Through the lifting device 12, the length extended into the gas pipeline can be controlled, on the one hand, the strength of the wireless signal can be adjusted; and on the other hand, the antenna assembly 1 can be retracted into the diffusing pipe when not using, so as to avoid being impacted by gas. Further, in the embodiment of the present disclosure, one end of the lifting device 12 of the antenna assembly 1 outside the gas pipeline is provided with an antenna angle adjuster 15, which can adjust an angle of the antenna body 13 to optimize wireless signal transmission between the antenna assembly 1 and the robot, and thus the practicability is stronger.

In a specific embodiment, the repeater retracting device 3 includes a repeater cartridge body 31, a vertical sliding rail 32, a lateral sliding rail 33 and a manipulator 34. A lower end of the vertical sliding rail 32 is fixedly connected to the repeater cartridge body 31, one end of the lateral sliding rail 33 is connected to the vertical sliding rail 32 through a vertical sliding block, and the manipulator 34 is connected to the lateral sliding rail 33 through a lateral sliding block. The repeater retracting device 3 with this structure has the advantages of simple structure and convenient operation. A vertical position of the manipulator 34 can be controlled by the vertical sliding rail 32, and a lateral position of the manipulator 34 can be controlled by the lateral sliding rail 33. The lowering and reclaiming functions of the repeater assembly 2 can be realized by controlling the positions in the above two directions and combining the manipulator 34. It should be noted that the repeater retracting device 3 is not limited to the above-mentioned structural forms, but may also adopt other equivalent or similar structural forms as long as the lowering and reclaiming functions of the repeater assembly 2 can be realized.

In a preferred embodiment, the repeater assembly 2 of the present disclosure includes a base 21 and a repeater main body 22, and the repeater main body 22 is fixed to the base 21. The base 21 is provided with a connecting block 211, a U-shaped magnetic block 212 embedded in the connecting block 211 and having an opening facing downward, and a first magnetic guide block 213 and a second magnetic guide block 214 corresponding to lower sides of two ends of the U-shaped magnetic block 212. A first sliding chute is disposed at a position corresponding to a gap between a left side of the connecting block 211 and the first magnetic guide block 213 and the U-shaped magnetic block 212, a first sliding magnetic conductive plate 215 is arranged in the first sliding chute, and a first return spring (not shown in FIG. 3) is disposed between the first sliding magnetic conductive plate 215 and the connecting block 211. A second sliding chute is disposed at a position corresponding to a gap between a right side of the connecting block 211 and the second magnetic guide block 214 and the U-shaped magnetic block 212, a second sliding magnetic conductive plate 216 is arranged in the second sliding chute, and a second return spring (not shown in FIG. 3) is disposed between the second sliding magnetic conductive plate 216 and the connecting block 211. The repeater assembly 2 with this structure can make the first magnetic guide block 213 and the second magnetic guide block 214 to generate magnetism or lose magnetism by controlling the first sliding magnetic conductive plate 215 and the second sliding magnetic conductive plate 216. When the repeater assembly 2 is placed in the gas pipeline, the magnetism generated by the first magnetic guide block 213 and the second magnetic guide block 214 can enable the repeater assembly 2 to be adsorbed on the wall of the gas pipeline, thereby effectively preventing the repeater assembly 2 from moving or being overturned due to air flow, and improving the stability of the repeater assembly 2 and the reliability of communication. The specific process is as follows: in an initial state, the first sliding magnetic conductive plate 215 and the second sliding magnetic conductive plate 216 are disposed at the position corresponding to the outer side of the gap between the upper ends of the first magnetic guide block 213 and the second magnetic guide block 214, the first magnetic guide block 213 and the second magnetic guide block 214 generate magnetism under the magnetization of the U-shaped magnetic block 212, and the repeater assembly 2 is adsorbed on the repeater cartridge body 31 of the repeater retracting device 3 through the first magnetic guide block 213 and the second magnetic guide block 214. During lowering, the repeater retracting device 3 clamps the repeater assembly 2 through the actuator of the manipulator 34, and causes the first sliding magnetic conductive plate 215 and the second sliding magnetic conductive plate 216 to correspondingly enter the gap between the upper ends of the first magnetic guide block 213 and the second magnetic guide block 214, so that the magnetic paths of the first magnetic guide block 213 and the second magnetic guide block 214 are short-circuited, and the first magnetic guide block 213 and the second magnetic guide block 214 lose magnetism; when the manipulator 34 moves the repeater assembly 2 to the lowered position, the actuator is released, and the first sliding magnetic conductive plate 215 and the second sliding magnetic conductive plate 216 are correspondingly reset under the elastic force of the first return spring and the second return spring. At this time, the magnetic fluxes of the first magnetic guide block 213 and the second magnetic guide block 214 generate magnetism due to connection, and the repeater assembly 2 will be adsorbed on the wall of the gas pipeline through the first magnetic guide block 213 and the second magnetic guide block 214. The reclaiming process of the repeater assembly 2 is similar to the lowering process of the repeater assembly 2, and details are not described herein again.

In addition, in order to cooperate with the structural features of the repeater assembly 2, the present specific embodiment allows the manipulator 34 of the repeater retracting device 3 to adopt two symmetrically distributed tapered plates, therefore, the stability and reliability of clamping the repeater assembly 2 can be enhanced.

Figure 5:
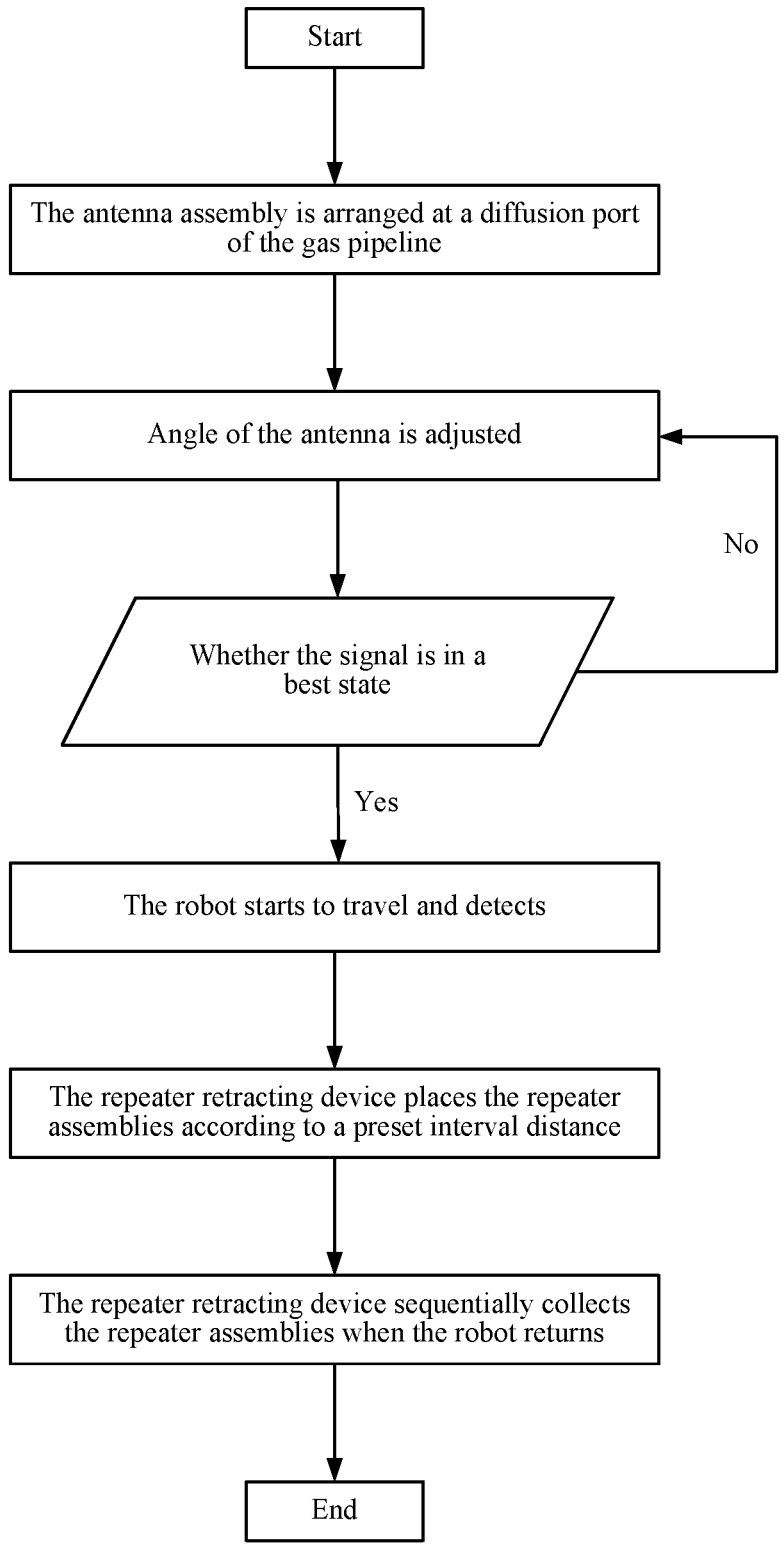
FIG. 5 is a simple flow chart of a wireless communication method for a cableless detection robot for a gas pipeline according to the present disclosure.

Based on the same inventive concept, the present disclosure also provides a wireless communication method for a cableless detection robot for a gas pipeline, applied in the wireless communication system using the above wireless communication system, as shown in FIG. 5, the wireless communication method specifically includes the following steps.

S1. The antenna assembly 1 is arranged at a diffusion port of the gas pipeline, a plurality of the repeater assemblies 2 are disposed in the repeater cartridge body 31 of the repeater retracting device 3, and the repeater retracting device 3 is connected to the robot.

S2. The robot and the repeater retracting device 3 are arranged in the gas pipeline through a robot retracting device disposed on the gas pipeline. The robot retracting device is a device that is disposed on the gas pipeline and used to place the robot into the gas pipeline or to recover the robot from the gas pipeline.

S3. The control terminal sends a test signal to the robot through the antenna assembly 1 and receives a feedback signal from the robot, compares the test signal and the feedback signal, and adjusts an angle of the antenna body 13 through the antenna angle adjuster 15 to optimize wireless signal transmission between the antenna assembly 1 and the robot. The control terminal refers to an upper computer that controls the robot to perform detection in the gas pipeline, and is connected to the connector 14 of the antenna assembly 1 by wire or wireless.

S4. The control terminal sends a detection instruction to the robot through the antenna assembly 1, after receiving the detection instruction, the robot travels along the gas pipeline, and sends a detection signal to the control terminal through the antenna assembly 1 during the traveling process.

S5. During the traveling process of the robot, according to a preset interval distance, the repeater retracting device 3 places the repeater assemblies 2 in the repeater cartridge body 31 one by one in the gas pipeline through the manipulator 34. The preset interval distance is determined according to the transmission distance and attenuation rule of the wireless signal in the gas pipeline.

S6. After a detection task is completed, the robot returns along an original path; during the returning process of the robot, the repeater retracting device 3 sequentially collects the repeater assemblies 2 in the gas pipeline into the repeater cartridge body 31 through the manipulator 34.

The wavelengths of the test signal, the feedback signal, the detection instruction and the detection signal are less than 3.41r, wherein r represents the minimum radius of the detected gas pipeline.

The wireless communication method for a cableless detection robot for a gas pipeline provided by the present disclosure has the advantages of easy implementation, convenient control and reliable communication, and solves the problem that the cableless detection robot cannot perform a long-distance internal detection operation in the gas pipeline.

INDUSTRIAL APPLICABILITY

According to the wireless communication system and communication method for a cableless detection robot for a gas pipeline provided by the present disclosure, by making the antenna assembly, the repeater assembly and the robot to use the wireless signal having a wavelength less than 3.41r, the wireless signal will propagate in the form of waveguide along the inside of the gas pipeline, thereby establishing a two-way communication connection between the antenna assembly and the robot. During the detecting and traveling processes of the robot, by placing, by the repeater retracting device, the repeater assemblies one by one in the gas pipeline according to the preset interval distance, and sequentially collecting the repeater assemblies during the returning process, the reliability and stability of the communication connection between the antenna assembly and the robot are ensured under the amplification effect of the repeater assembly on the wireless signal, therefore, the purpose of performing the long-distance detection in the gas pipeline by the robot can be realized.

What is claimed is:

1. A wireless communication system for a cableless detection robot for a gas pipeline, comprising:
    an antenna assembly (1);
    a plurality of repeater assemblies (2); and
    a repeater retracting device (3),
    wherein the antenna assembly (1) is fixed to the gas pipeline and extends into the interior of the gas pipeline, and the repeater retracting device (3) is connected to the robot and configured to place one or more selected repeater assemblies from the plurality of repeater assemblies along the gas pipeline, the antenna assembly (1), the one or more placed repeater assemblies (2) and the robot are in communication through a wireless signal having a wavelength less than 3.41r, wherein r represents a radius of the gas pipeline.

2. The wireless communication system for a cableless detection robot for a gas pipeline according to claim 1, wherein the antenna assembly (1) comprises a flange plate (11) and a lifting device (12) vertically and fixedly connected to the flange plate (11), the flange plate (11) is fixedly connected to a diffusion port flange of the gas pipeline, one end of the lifting device (12) in the gas pipeline is provided with an antenna body (13), and a second end of the lifting device (12) outside the gas pipeline is provided with a connector (14) electrically connected to the antenna body (13).

3. The wireless communication system for a cableless detection robot for a gas pipeline according to claim 2, wherein the second end of the lifting device (12) of the antenna assembly (1) outside the gas pipeline is further provided with an antenna angle adjuster (15).

4. The wireless communication system for a cableless detection robot for a gas pipeline according to claim 3, wherein the repeater retracting device (3) comprises a repeater cartridge body (31), a vertical sliding rail (32), a lateral sliding rail (33) and a manipulator (34), wherein a lower end of the vertical sliding rail (32) is fixedly connected to the repeater cartridge body (31), one end of the lateral sliding rail (33) is connected to the vertical sliding rail (32) through a vertical sliding block, and the manipulator (34) is connected to the lateral sliding rail (33) through a lateral sliding block.

5. The wireless communication system for a cableless detection robot for a gas pipeline according to claim 4, wherein each repeater assembly (2) of the plurality of repeater assemblies comprises a base (21) and a repeater main body (22) fixed to the base (21), the base (21) comprises a connecting block (211), a U-shaped magnetic block (212) embedded in the connecting block (211) and having an opening facing downward, and a first magnetic guide block (213) and a second magnetic guide block (214) corresponding to lower sides of two ends of the U-shaped magnetic block (212), wherein a first sliding chute is disposed at a position corresponding to a gap between a left side of the connecting block (211) and the first magnetic guide block (213) and the U-shaped magnetic block (212), a first sliding magnetic conductive plate (215) is arranged in the first sliding chute, a first return spring is disposed between the first sliding magnetic conductive plate (215) and the connecting block (211), a second sliding chute is disposed at a position corresponding to a gap between a right side of the connecting block (211) and the second magnetic guide block (214) and the U-shaped magnetic block (212), a second sliding magnetic conductive plate (216) is arranged in the second sliding chute, and a second return spring is disposed between the second sliding magnetic conductive plate (216) and the connecting block (211).

6. A wireless communication method for a cableless detection robot for a gas pipeline, applied in the wireless communication system of claim 5, comprising the following steps:

S1. arranging the antenna assembly (1) at a diffusion port of the gas pipeline, disposing the plurality of the repeater assemblies (2) in the repeater cartridge body (31) of the repeater retracting device (3), and connecting the repeater retracting device (3) to the robot;

S2. arranging the robot and the repeater retracting device (3) in the gas pipeline through a robot retracting device disposed on the gas pipeline;

S3. sending, by a control terminal, a test signal to the robot through the antenna assembly (1) and receiving a feedback signal from the robot, comparing the test signal and the feedback signal, and adjusting an angle of the antenna body (13) through the antenna angle adjuster (15) to optimize wireless signal transmission between the antenna assembly (1) and the robot;

S4. sending, by the control terminal, a detection instruction to the robot through the antenna assembly (1), making the robot travel along a path in the gas pipeline after receiving the detection instruction, and receiving, by the control terminal, a detection signal sent by the robot through the antenna assembly (1) during the traveling process;

S5. during the traveling process of the robot, placing, by the repeater retracting device (3), the repeater assemblies (2) in the repeater cartridge body (31) one by one in the gas pipeline through the manipulator (34) according to a preset interval distance;

S6. making the robot return along the path after a detection task is completed, and sequentially collecting, by the repeater retracting device (3), the repeater assemblies (2) in the gas pipeline into the repeater cartridge body (31) through the manipulator (34) during the returning process of the robot, wherein the wavelengths of the test signal, the feedback signal, the detection instruction and the detection signal are less than 3.41r, wherein r represents the minimum radius of the detected gas pipeline.

\* \* \* \* \*